J. H. TUCKER.
VEHICLE TIRE.
APPLICATION FILED AUG. 1, 1912.
1,077,176.
Patented Oct. 28, 1913.
3 SHEETS—SHEET 2.
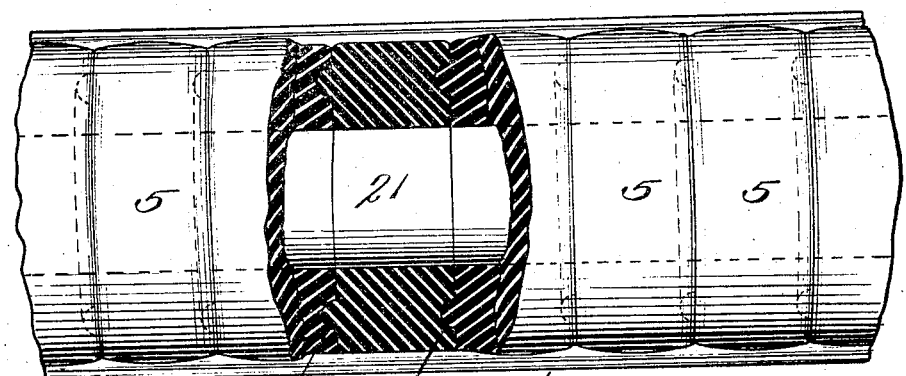
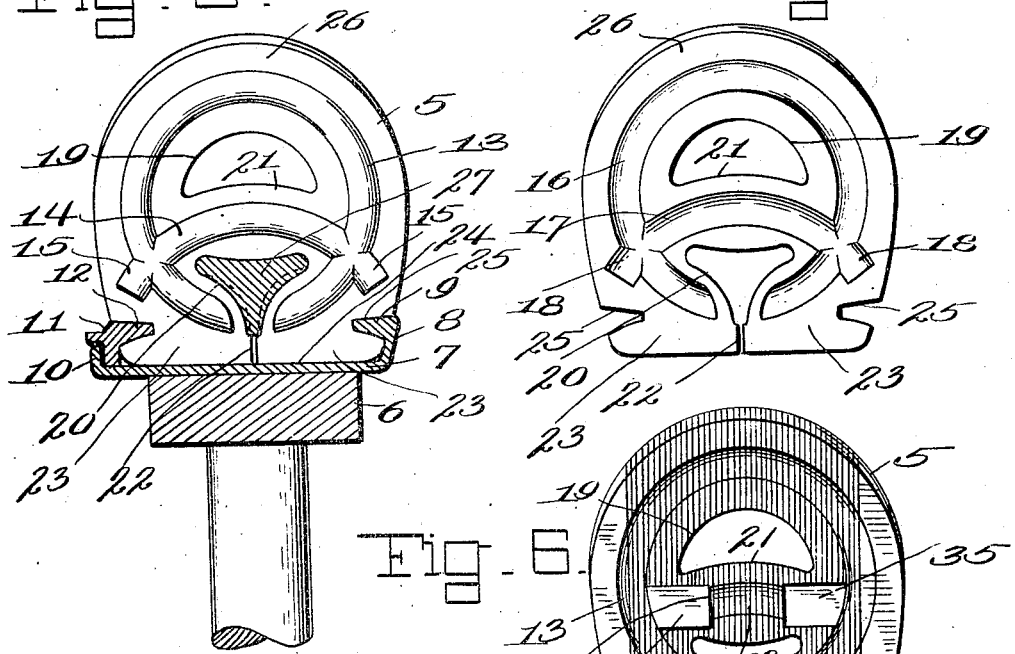
Witnesses:
Inventor
James H. Tucker

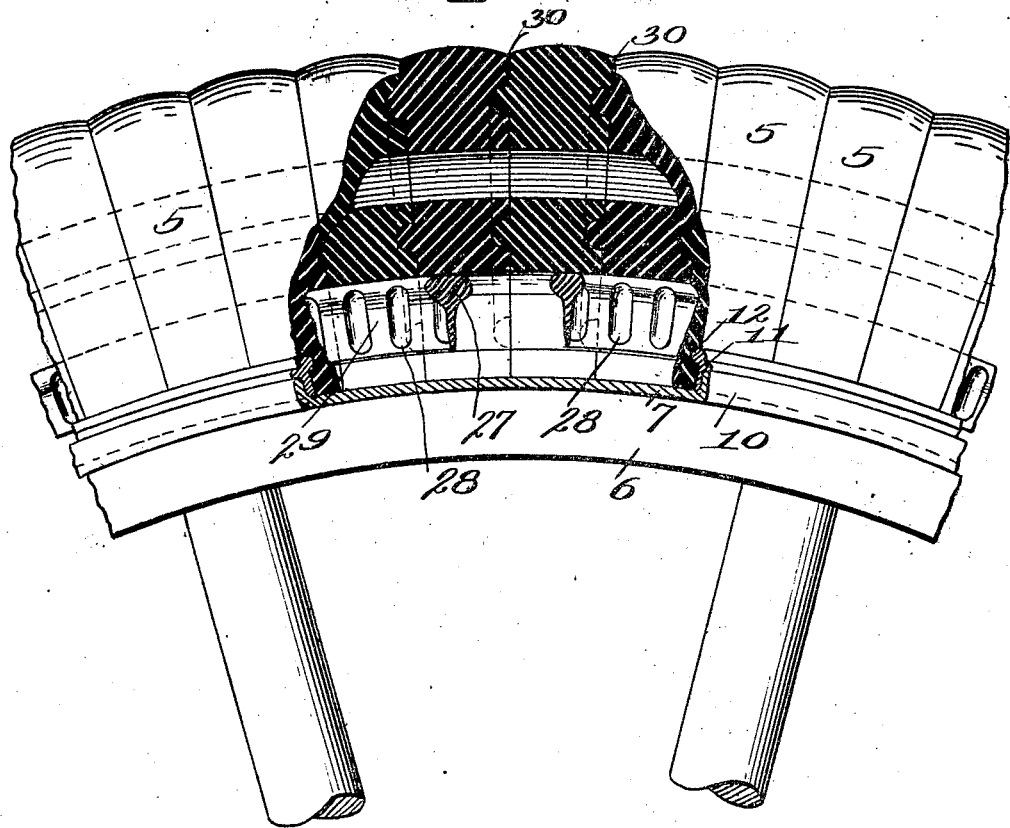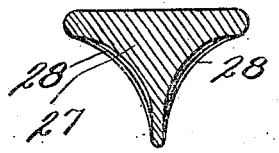

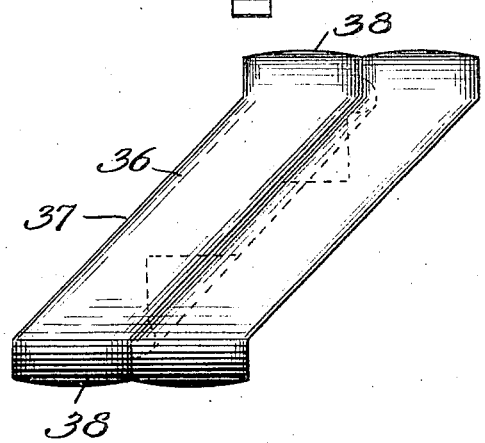
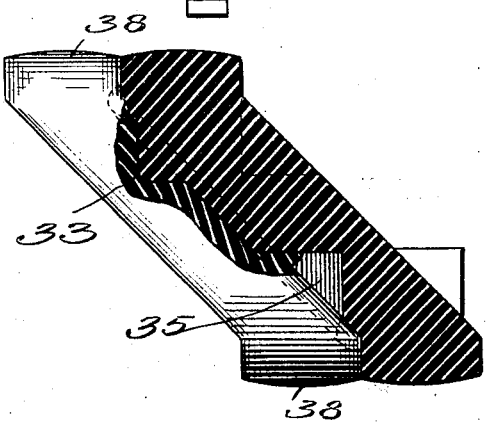
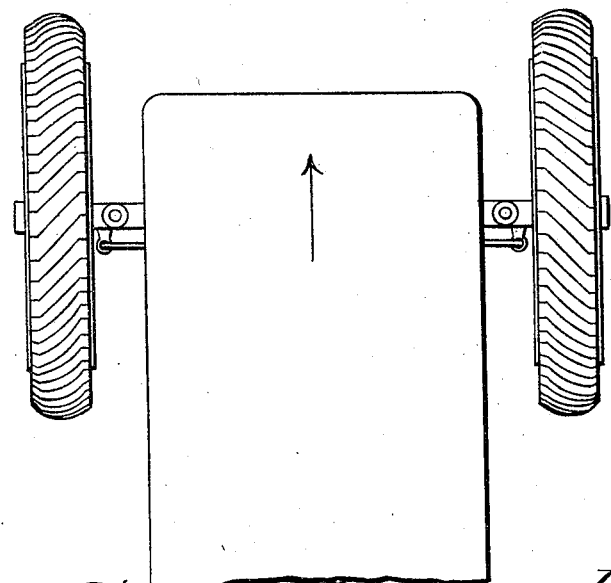

UNITED STATES PATENT OFFICE.

JAMES H. TUCKER, OF PETERSBURG, VIRGINIA.

VEHICLE-TIRE.

1,077,176.  Specification of Letters Patent.  Patented Oct. 28, 1913.

Application filed August 1, 1912. Serial No. 712,758.

*To all whom it may concern:*

Be it known that I, JAMES H. TUCKER, a citizen of the United States, residing at Petersburg, in the county of Dinwiddie and State of Virginia, have invented new and useful Improvements in Vehicle-Tires, of which the following is a specification.

This invention relates to vehicle tires and has for its special object the production of a resilient tire embodying all of the characteristics and qualities of a pneumatic tire, but not subject to the disadvantages incident to puncture as the common form of inner tube and the operation of inflating are dispensed without detracting materially from the effectiveness of the improved tire in its tractive service.

A further object of the invention is to provide a vehicle tire made up of interlocking sections wherein the locking mediums extend over a considerable surface of the opposing faces of the several sections to strengthen the tire as a whole and effectively assemble the sections and to retain the sections in coöperating relation by a simple and effective means which contributes to the successful wearing qualities and positive retention of the sections in place.

A further object of the invention is to provide a rigidly supported tire composed of sections of a resilient character and conjointly producing a plurality of cushions and having retaining means interposed between the inner portions of the sections and the rim of the wheel to produce a resilient support or an inner cushion adjacent to the wheel rim.

A further object of the invention is to produce a tire composed of a plurality of resilient sections having a rigid support and to render the life of the tire much longer by increasing the elasticity through the medium of the plurality of cushions between the inner portions of the sections secured to the wheel rim and the outer tread portion of the tire and thereby reduce the wear and roughness of the tire, particularly at the points where the tire sections are secured to the wheel rim.

A still further object of the invention is to provide a tire composed of a plurality of resilient sections associated with means for preventing creeping of the tire by securing each section interiorly relative to the retaining means for all of the sections.

With these and other objects and advantages in view the invention consists in the construction and arrangement of the several parts which will be more fully hereinafter described and claimed.

In the drawings: Figure 1 is a view in elevation, partly in section, of a portion of a tire embodying the features of the invention and shown attached to a wheel rim. Fig. 2 is a top plan view of a portion of a tire partly in section. Fig. 3 is a cross-sectional view taken in the plane of the engaging faces of two of the sections and illustrating the rim and its contributing holding members in section as well as the retaining means for the several tire sections. Fig. 4 is a detail elevation of one of the tire sections. Fig. 5 is a cross-sectional view of the retaining ring for the tire sections. Fig. 6 is a detail elevation of one of the tire sections showing a slight modification. Fig. 7 is a top plan view of a slightly modified form of the tire sections showing them provided with diagonal engaging faces. Fig. 8 is a view similar to Fig. 7, partially in section, showing the manner of associating the diagonal faces or adjacent sides of the sections. Fig. 9 is a top plan view of a portion of an automobile and running gear and wheels provided with tires composed of sections having diagonal or oblique engaging faces or sides and also illustrating the change in angularity of the sections relatively to right and left positions.

The numeral 5 designates a plurality of resilient independent tire sections preferably made of rubber and adapted to be secured to a rim 6 of a wheel, the rim embodying a peripheral seat plate 7 having a flange 8 at one side with an inwardly extending clencher projection 9 and a straight angular flange 10 at the opposite side edge with which a clencher annulus or ring 11 is associated and provided with an inwardly projecting extension 12 similar to the projection 9. As shown by Figs. 1, 2, 3 and 4, the sections 5 are duplicate in construction and are segmental in their contour so that when they are associated their opposite faces or sides will closely interlock. Each section 5 embodies in one face an approximately circular rib 13 intersected by a segmental rib 14 below the center of the section, the terminals of the segmental rib 14 projecting beyond the portions of the rib 13 intersected thereby, as at 15. The opposite face of each section 5, as shown by Fig. 4, has a corresponding approximately circular groove 16 and an intersecting segmental groove 17, the latter having its terminal portions 18 extending outwardly beyond the groove 16, the grooves 16, 17 and 18 being adapted to snugly receive the ribs 13 and 14 and the extensions 15. Each section is also formed with an opening 19 therethrough above the center, and below the plane of the rib 14 on one face and the groove 17 on the opposite face each section is also constructed with a substantially inverted triangular opening 20, the rib 14 and the groove 17 being formed as portions of an intermediate resilient bridge 21. The inverted apex of the opening 20 terminates above the under side or base surface of the section, the latter being cut through or slitted, as at 22, from the center of the said apex through to the under side of the section. Clencher members or feet 23 are formed below the lower terminals of the rib 13 and groove 16 on opposite sides of the vertical center of the section, the said feet having flat bottom surfaces 24 and also provided with recesses 25 at their outer sides above the bottom surfaces to receive the projections 9 and 12. It will be seen that a considerable mass of material exists between the lower apex of the opening 20 and the under side of the section so that a resilient cushion is formed between the said lower terminal of the opening 20 and the lower surface of the section, and above the opening 20 the bridge 21 provides a second cushion and between the opening 19 and the tread surface of the section a third cushion 26 is formed.

Threaded through the openings 20 of the several sections is a ring 27 which is of the same contour as the said openings, and at regular intervals in the opposite concave sides thereof grooves 28 are formed and extend upwardly thereover from a point near the lower terminal of the ring to a point adjacent the upper terminals of the opposite sides of the base. These grooves 28 provide ribs 29 throughout the length of the rim and when the sections 5 are assembled on the ring the opposite side walls of the opening 20 have portions thereof forced into the grooves 28 at intervals, this engagement with the grooves being set up when the feet 23 are disposed on the seat plate 7 and the clencher annulus 25 applied and secured as shown by Fig. 3. Through the medium of this ring 27 with the grooves 28 and ribs 29, creeping of the sections or of the entire tire is prevented, it being understood that the ends of the ring will be suitably joined or brought into close engagement. It will be observed that between the lower terminal of the ring 27 and the flat under sides of the sections or the bottom surfaces of the feet 23 a rubber cushion is provided and extends throughout the length of the tire and gives to the latter greater resiliency and at the same time the ring operates to maintain the sections in secure position relatively to the rim 6 and plate 7. Above the ring 27 the bridge 21 sets up an additional cushion and outwardly beyond the opening 19 the third cushion 26 will not be subjected to any hard action or resistance to free resilient cushioning operation by the said ring. The several sections are also prevented from separating or pulling away from each other through the medium of the ribs 13 and 14 and the extensions 15 respectively engaging the grooves 16, 17 and 18, and the lock produced by the extensive character of the ribs and grooves over the greater portion of the contiguous sides or faces of the sections will insure a positive obstruction to lateral displacement of the sections and also prevent the entrance of grit and water to the interior of the tire, and as an additional means for preventing grit entering between the sections the outer edge engaging portions have guard lips or slight overlapping edges, as at 30, which operate when the tire is compressed to bind more closely and close the outer portions of the joints of the sections. The obstruction to the entrance of grit through the outer portions of the joints of the sections as just explained will add largely to the success and durability of the tire by obviating the aggregation of gritty wearing material between the sections.

The parts of the tire as thus far described may be quickly and easily assembled, and it will be seen that as each section is a duplicate of the other the cost of production will be materially reduced, as the several sections may be individually formed by a single mold or at one operation.

In the modification shown by Fig. 6 the section 5 has the groove 13 continued at its lower terminals by converging extensions 31 outwardly into the feet 23 and in the bridge 21 a short cross groove 32 may be formed, the opposing face of the section being correspondingly formed with ribs. The extensions 31 of the groove 13 provide for a more positive securement or jointure of the feet 23 when the correspondingly shaped ribs engage the same. The groove 13 as shown by Fig. 4, for instance, could be provided with the extensions 31 as the change is an obvious one and it will be understood that in like manner the ribs could be correspondingly modified on the opposite face of each section. The section 5 as shown by Fig. 6 has an intermediate locking lug 33 disposed horizontally below the lower wall of the opening 19 and at one side of the vertical center of the section, the said lug being enlarged gradually toward an inner maximum projecting terminal or shoulder 34, and on opposite side of the vertical center of the section a recess 35 corresponding in contour to the lug 33 is formed to receive a similar lug on a contiguous section. This intermediate lock provides additional means for preventing lateral displacement of the sections and the same structure is embodied in the sections 36, shown by Figs. 7, 8 and 9, the latter being constructed with oblique faces 37 terminating in square locks 38 at opposite ends. Figs. 7 and 8 show the sections disposed for use on tires of right and left wheels, as more fully illustrated by Fig. 9, and also indicate that the several sections of the tire may be diagonally arranged or formed on the bias, as it were. The square locks 38 facilitate the positive application of the sections to the rim of the wheel and insure a reliable retention in their applied position. The contiguous faces of the sections 36 are constructed with the ribs and grooves as hereinbefore described and as shown for instance by Fig. 6, or the said ribs and grooves may be similar to those illustrated by Figs. 3 and 4, and in addition the intermediate locking lugs 33 and corresponding recesses 35 are formed in the contiguous faces of these sections. As shown by Fig. 9 the advantages accruing from the ribs and grooves together with the intermediate locking lugs 33 and recesses 35 are augmented by the diagonal faces especially when turning a wheel to the right and left or when one wheel serves as the pivot wheel, as it were, and the other swings in an arc as in the ordinary turning movements of a vehicle. Under these latter conditions and in view of the construction and arrangement shown by Figs. 7, 8 and 9, the gaping of the sections will be obstructed to a material degree and the wearing qualities of the tire advantageously increased.

What is claimed is:

1. A vehicle tire comprising a plurality of independent sections having upper and lower openings therethrough with a resilient bridge between the upper and lower openings and a yielding cushion between the lower openings and the bases of the sections, the sections also having interlocking grooves and tongues respectively formed in opposite faces and partially extending inwardly over the bridges, and a retaining ring inserted through the lower openings of the sections and having its lowermost portion held elevated above the lower terminals of said sections.

2. A vehicle tire comprising a plurality of independent resilient sections having openings therethrough separated by intermediate bridges and provided with interlocking grooves and tongues respectively formed in opposite faces, a resilient cushion being formed between the lower openings and the bases of the sections, and a retaining ring inserted through the lower openings and having vertical grooves extending along opposite sides thereof into which the side walls of the lower openings are forced at intervals to prevent creeping of the tire sections.

3. A vehicle tire comprising a plurality of independent resilient sections having upper and lower openings therethrough intercepted by bridges and also provided with interlocking tongues and grooves respectively formed in the opposing faces thereof and extending over the bridges and also above the upper openings and adjacent to the lower openings, a cushion being formed between each lower opening and base of the section, a ring inserted through the lower openings of the sections, and a rim in which the bases of the sections are inserted and secured, the lowermost portion of the ring being held above and out of contact with the rim by the cushions between the lower openings and bases of the sections.

4. A vehicle tire comprising a plurality of independent resilient sections formed with upper and lower openings separated by cross bridges and also provided with interlocking tongues and grooves respectively formed in the opposing faces thereof and continuing above the upper openings and downwardly adjacent to the lower openings and also transversely of the sections over the bridges, a ring inserted through the lower openings of the sections between the lower portions of the tongues and grooves in the opposite faces of the sections and a rim in which the bases of the sections are fitted and secured, the ring having an upper transversely extended portion and a lower reduced portion supported above and held out of contact with any part of the rim.

5. A vehicle tire comprising a plurality of independent resilient sections having interlocking tongues and grooves respectively formed in the opposing faces thereof, the faces also provided with intermediate locking lugs and recesses in reverse positions on the opposite faces of the sections, a ring inserted through the lower portions of the sections below the said locking lugs and recesses, and a rim in which the bases of the sections are secured, the ring being retained in position independently of the said locking lugs and recesses.

6. A vehicle tire comprising a plurality of independent resilient sections having interlocking tongues and grooves in opposing faces thereof and also provided with intermediate locking lugs and recesses in alternate positions in the opposing faces, the opposing faces of the sections being in the main formed obliquely and continuing into square locks at opposite ends, a securing means inserted through the sections, and a rim in which the bases of the sections are secured.

7. A vehicle tire comprising a plurality of independent resilient sections having interlocking means respectively formed in the opposing faces thereof and also formed with lower centrally located openings therethrough above the bases of the sections and also with upper openings, the interlocking means extending around and between the said openings, and a ring inserted through the lower openings and located wholly above the lower terminals of the bases of the sections and having cushion means between the lowermost portion of the ring and the said bases of the sections.

In testimony whereof I have hereunto set my hand in presence of two subscribing witnesses.

JAMES H. TUCKER.

Witnesses:
  S. J. PINCHARD, Jr.,
  E. H. BEASLEY.